(12) United States Patent  (10) Patent No.: US 8,342,039 B2
Wickens  (45) Date of Patent: Jan. 1, 2013

(54) PROCESS FOR MEASURING PRELOADING OF LOW-ROLLING RESISTANCE BEARINGS

(76) Inventor: Jeffrey S. Wickens, Plymouth, MI (US)

( * ) Notice: Subject to any disclaimer, the term of this patent is extended or adjusted under 35 U.S.C. 154(b) by 377 days.

(21) Appl. No.: 12/723,454

(22) Filed: Mar. 12, 2010

(65) Prior Publication Data
US 2011/0219886 A1  Sep. 15, 2011

(51) Int. Cl.
G01L 5/00 (2006.01)
(52) U.S. Cl. .................................... 73/862.55
(58) Field of Classification Search ................ 73/862.55
See application file for complete search history.

(56) References Cited

U.S. PATENT DOCUMENTS

| | | | |
|---|---|---|---|
| 4,054,999 A | 10/1977 | Harbottle | |
| 4,336,641 A | 6/1982 | Bhatia | |
| 5,115,558 A * | 5/1992 | Bernhardt et al. | 29/705 |
| 5,125,156 A * | 6/1992 | Witte | 29/898.09 |
| 5,488,871 A | 2/1996 | Harbottle | |
| 5,579,570 A | 12/1996 | Bonvallet | |
| 5,718,049 A | 2/1998 | Ohtsuki et al. | |
| 6,070,325 A | 6/2000 | Miyata et al. | |
| 6,088,910 A * | 7/2000 | Jerraid | 29/724 |
| 6,146,295 A * | 11/2000 | Mor et al. | 474/13 |
| 6,327,773 B1 | 12/2001 | Rode | |
| 6,446,339 B2 * | 9/2002 | Takamizawa et al. | 29/898.09 |
| 6,588,119 B1 * | 7/2003 | Russell et al. | 33/517 |
| 6,640,438 B2 | 11/2003 | Webb et al. | |
| 6,685,359 B2 | 2/2004 | Wickens | |
| 6,907,773 B2 | 6/2005 | Passino et al. | |
| 7,320,251 B2 * | 1/2008 | Harada et al. | 73/779 |

* cited by examiner

Primary Examiner — Lisa Caputo
Assistant Examiner — Octavia Davis-Hollington

(57) ABSTRACT

A system and method for measuring the preload condition of a vehicle differential gear assembly includes a multi-axis load cell having a spherical load button. The differential assembly is supported by the pinion shaft and the load cell button is positioned within a carrier housing hole. The pinion shaft is then rotated relative to the housing resulting in the housing to rotate along with the pinion shaft and abut against the load button. The resulting force against the button is measured in three orthogonal directions permitting an accurate force vector to be determined. The bearings preload is simultaneously set by applying an axial compressive force against the bearings while the pinion shaft is rotated.

15 Claims, 4 Drawing Sheets

PROCESS FOR MEASURING PRELOADING OF LOW-ROLLING RESISTANCE BEARINGS

FIELD OF THE INVENTION

The present invention relates to the assembly of vehicle differentials and more specifically to a system and method for setting pinion bearing preload.

BACKGROUND OF THE INVENTION

A vehicle differential turns the flow of power 90 degrees from the engine drive shaft to the vehicle wheels, reduces drive shaft revolutions to a useful wheel speed, and divides power between the driven wheels so one wheel can rotate at a different speed than the other. The differential includes a carrier housing, an input drive pinion shaft extending into the housing with a pinion gear that engages a ring gear. The ring gear carries small spider and side gears which are coupled to the axle shafts. The pinion shaft is supported by pinion bearings which are placed in a preloaded condition to maintain proper alignment of the pinion drive shaft during operation.

Preload is a bearing setting in which there is substantially no clearance in the bearing between the inner walls of the bearing races and the rollers contained therebetween. Preloading is achieved by tightening a nut down the pinion shaft to apply a compressive force to the pinion bearings resulting in a slight amount of resistance to rotation.

The pinion bearing preload is often determined by measuring the pinion bearing's rolling torque whereby a machine supports the differential assembly by the pinion shaft and also rotates the pinion shaft relative to its housing. The rolling resistance or drag in the pinion bearings will cause the carrier housing to rotate. Currently, the resulting reaction torque on the housing is measured by abutting a torque sensor against a relatively flat portion on the exterior surface of the housing. This torque sensor includes an elongated pivoting probe arm which extends from a single axis load cell which measures the force applied by the housing. The amount of preload in the pinion bearings is then calculated according to methods well known in the art. The bearings are preloaded by simultaneously advancing a nut which applies compressive forces against the inner races of the pinion bearings. As the nut is tightened, the bearings reach the desired preloaded condition. The reaction torque is continually monitored, with the machine stopping the nut's advancement when the desired preload condition reaction torque is achieved.

Automobile manufacturers have recently started to replace the traditional tapered roller bearings with angular contact ball bearings for the pinion bearings. These ball bearings have lower rolling resistance (i.e., friction) than the tapered roller bearings, which improves the overall efficiency of the differential assembly. This decrease in bearing friction, however, reduces the rolling torque of the pinion bearing to such a degree that conventional measuring techniques cannot adequately determine whether the pinion bearings have been properly preloaded. The use of a pivoting elongated probe arm adds to the lack of precision in traditional sensors due to the clearances required to allow for the probe to be placed against the housing, along with the inherent inaccuracies and machining tolerances which "stack-up" as multiple mechanical components are integrated together. Additionally, to obtain an accurate measurement, current torque sensors must be precisely placed to be perpendicular to the reaction force. This is particularly difficult due to the variation of the normally un-machined outer surface of the differential housing.

Further, it is difficult and expensive to employ current preload torque sensors in conventional assembly lines, where various configurations of differentials having different housing sizes and/or shapes may be assembled. Typically, these assembly lines require different preloading stations and/or multiple sensors having suitable probes (i.e., one for each differential design that passes along a particular assembly line) thereby undesirably increasing the cost, complexity, and facility footprint needed to assemble the differentials.

There is therefore a need for a system and method for determining the pinion bearing preloading condition of differentials with low rolling resistance bearings. There is a further need for such a system and method which will readily measure the preloading condition of various differential assemblies with a single sensor.

SUMMARY OF THE INVENTION

The present invention provides a system and method for measuring the preload condition of a vehicle differential gear assembly. The system includes a multi-axis load cell having a spherical load button. The differential assembly is lifted by the pinion shaft and the load cell button is positioned within a machined hole in the carrier housing. The pinion shaft is then rotated relative to the housing resulting in the housing rotating along with the axis of the pinion shaft and abutting against the load button. The resulting force against the button is measured in three orthogonal directions. The bearings preload is simultaneously set by applying an axial compressive force against the bearings while the pinion shaft is rotated.

It is an advantage of the present invention to provide a system and method to accurately measure and simultaneously set the preload condition of low rolling resistance angular contact ball bearings mounted upon a pinion shaft in a vehicle differential.

It is another advantage of the present invention that it is particularly suited for assembly line operation by measuring resultant torque in the bearing set through the machined, consistently located housing holes. By taking the torque measurements with a spherical load button against a machined surface, various configurations and sizes of differential assemblies can pass through a single bearing preload station.

It is still another advantage of the present invention to provide a method of measuring bearing preload in a differential gear assembly's angular contact ball bearing set which supports a pinion shaft within the carrier housing. The method comprising the steps of: providing a multi-axis load cell having a spherical load button; positioning the spherical load button within a machined hole opening formed in the housing; rotating the pinion shaft relative to the housing so that the rotating pinion shaft imparts a torque to the housing through the bearing set, wherein the housing rotates and an inner surface of the machined hole opening abuts the load button; and measuring a force applied by the housing against the load button.

It is yet another advantage of the present invention to provide a method of measuring bearing preload in a differential gear assembly having an input pinion shaft supported by an antifriction bearing set within a housing, the method comprising the steps of: lifting and supporting the carrier housing assembly by the input pinion shaft such that a longitudinal axis of the input shaft is at a known angle; positioning a spherical load button within a machined hole opening in the housing; rotating the input shaft relative to the housing so that the rotating input shaft imparts a torque to the housing through the bearing set, wherein the housing rotates to abut an inner surface of the machined hole opening against said load button; and measuring a force applied by the housing against the load button in three orthogonal directions.

These and other objects, features and advantages of the present invention will become apparent from the following description when viewed in accordance with the accompanying drawings.

BRIEF DESCRIPTION OF THE DRAWINGS

The description refers to the accompanying drawings in which like reference characters refer to like parts throughout the several views, and in which.

DETAILED DESCRIPTION OF THE INVENTION

Figure 3:
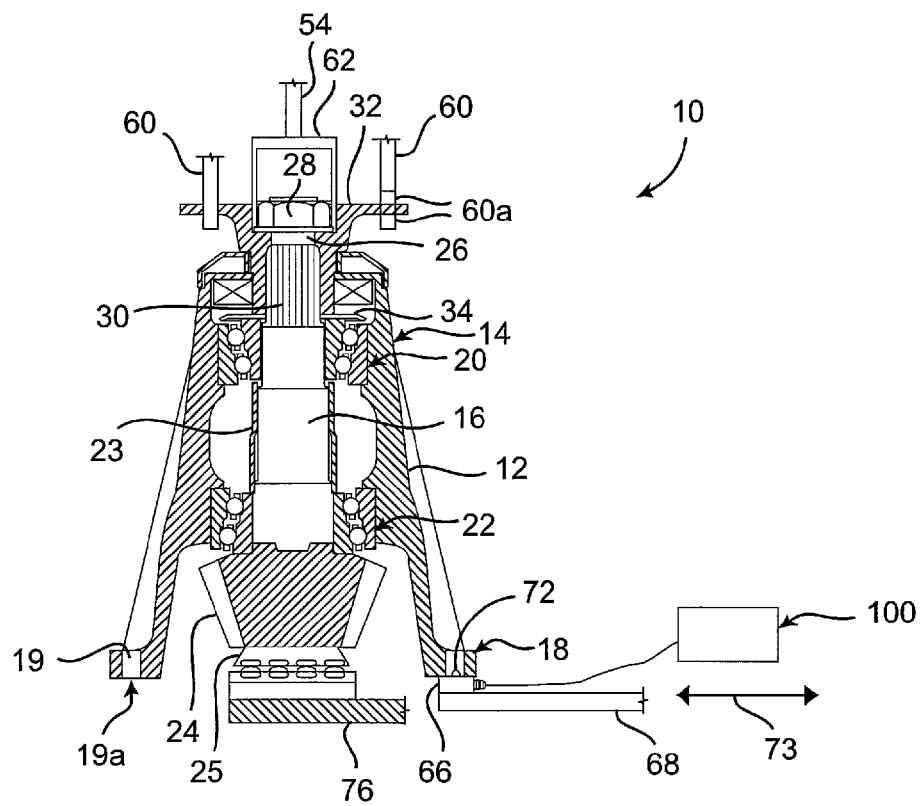
FIG. 3 is a partial side sectional view of a differential housing being supported by the pinion shaft and having a spherical load button mounted to a sensor inserted within one of the housing's holes.
Figure 3A:
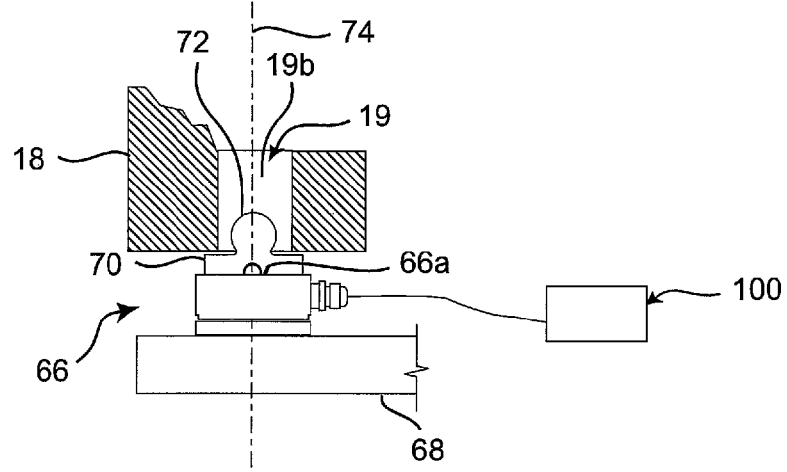
FIG. 3a is an enlarged view of the spherical load button inserted within the housing's bolt hole.

Referring initially to FIG. 3, a differential gear assembly is generally designated by the numeral 10. Differential gear assembly 10 includes a housing 12 having a pinion shaft end 14 for receiving a pinion shaft 16 therethrough and axle shaft end 18 which includes a plurality of hole openings 19 which run substantially parallel to the pinion shaft 16. The hole openings 19 are formed in lower end 18 for mounting a axle shaft housing or cover (not shown) thereto. The pinion shaft 16 is supported within housing 12 by a pair of antifriction roller bearings 20, 22. Currently, the trend in automobile differential design is such that bearings 20, 22 are angular contact ball bearings, which have a much lower rolling resistance (i.e., frictional moment) than the previously utilized tapered roller bearings. A collapsible sleeve 23 is located between the roller bearings 20 and 22.

A pinion gear 24 is mounted upon one end of the pinion shaft 16. The pinion gear 24 is adapted to mesh with gears (not shown) for providing torque and driving the wheel axle shafts. The pinion shaft 16 is threaded at its other end 26 for receiving a nut 28. The pinion shaft 16 is further provided with a splined section 30 for receiving a yoke 32 thereon, so as to engage and longitudinally slide along the pinion shaft 16. The yoke 32 is also adapted to engage and be driven by a drive axle (not shown). One or more spacers 34 are located on the pinion shaft 16 between the yoke 32 and the upper bearing 20.

During the assembly or production process the differential gear assembly 10 is placed upon a pallet or shuttle 40 which is adapted to move from assembly station to station as the differential gear assembly 10 is assembled. In the present invention, differential gear assembly 10 rests upon the top surface of pallet 40 with the pinion shaft 16 substantially vertical with the yoke 32 at the top and the housing's opposite end 18 at the bottom. It is not a prerequisite that the orientation of the pinion shaft be vertical. Any relative angle will be suitable provided that the angle in known.

Figure 1:
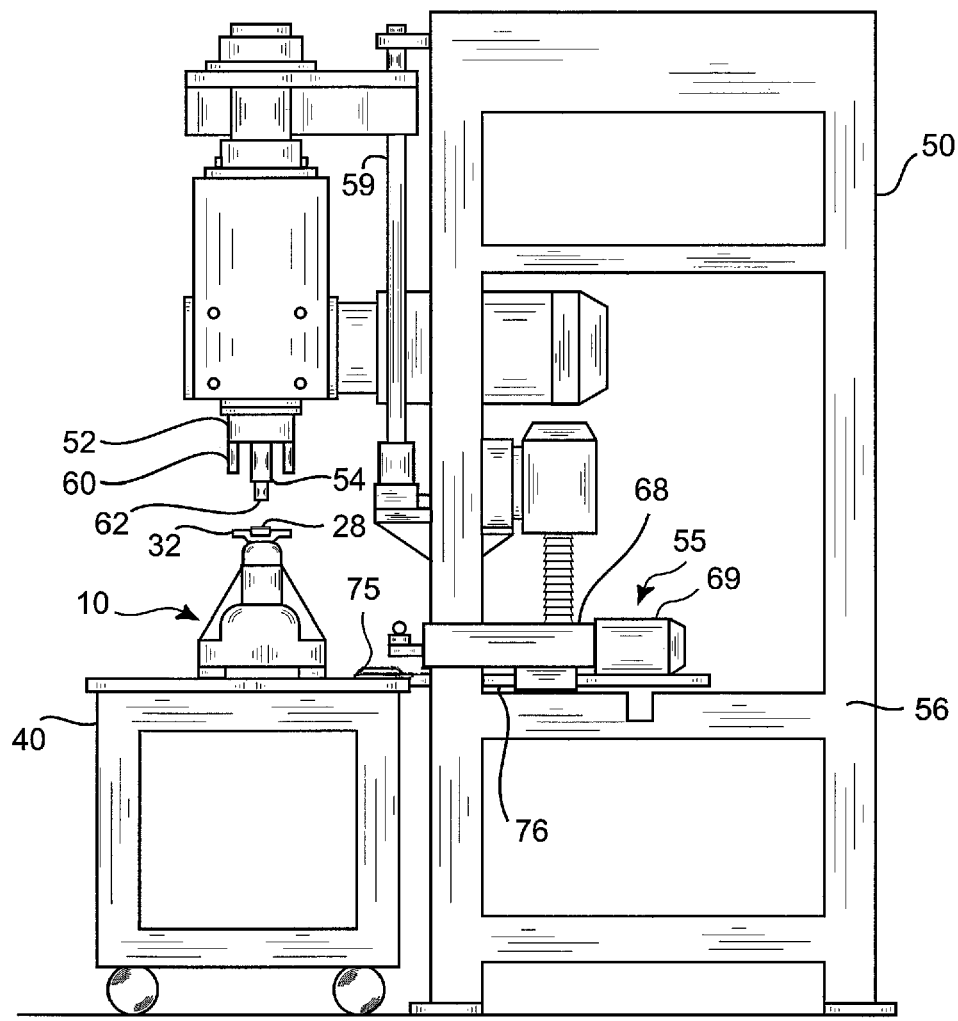
FIG. 1 is a side view of a differential bearing preload station having in a rest or non-operative position.

In the present invention, a bearing preload station 50 includes a pair of independently rotatable coaxial spindles 52, 54 and a torque sensor assembly 55. Spindles 52, 54 are mounted upon a support base 56 and are adapted to translate together vertically in the directions of arrows 57, 58 along guideway or railing 59. Spindles 52, 54 are movable from an unloaded or rest position shown in FIG. 1, to a raised position shown in FIG. 4, to a driving/rotating position shown in FIG. 2. Spindle 52 terminates in a drive head 60 which is adapted to grasp yoke 32 and rotate the yoke 32 and attached pinion shaft 16 between 20-100 revolutions per minute. Spindle 54 is mounted coaxially with spindle 52 and terminates in a socket or driver 62 which is sized to drive pinion nut 28.

A freely rotating turntable or center device 75 located on load arm 76 locates the pinion 24 in a manner which allows the preload station 50 to both rotate the yoke 32 and pinion shaft 16 clockwise and to remove the differential gear assembly 10 from pallet 40 and into engagement with drive head 60. To that end, station 50 lowers spindle 52 toward a differential assembly 10 disposed upon pallet 40. In the embodiment illustrated, drive head 60 includes spaced fingers 60a, which receive a portion of the yoke 32 allowing the drive head 60 to locate and support the differential assembly 10 by the yoke 32. After locating yoke 32, centering device 75 and support arm 76 are translated simultaneously toward the spindle 52, advancing the differential assembly 10 off of pallet 40. The differential assembly 10 is then supported by the centering device 75 and spindle 52 at opposite ends of the pinion 24. It should be appreciated that while the load arm 76 and centering device 75 are translated to remove the assembly 10 from pallet 40, spindle 52 is retracted by the advancing load of the support arm 76 and the centering device 75, thereby lifting the differential assembly 10 up off the pallet 40 into a driving or measuring position.

Drive head 60 and socket 62 are configured to simultaneously engage the yoke 32 and pinion nut 28, respectively when station 50 is in the driving position. Further, spindle 54 rotates in the same direction as spindle 52, but at a slightly higher angular velocity to tighten pinion nut 28 down onto pinion shaft 16. In this manner, both spindles 52 and 54 rotate different components of the differential assembly 10 simultaneously. Machines with the above capabilities and components of preload station 50 are commercially available from Pyxis Technologies, LLC of Plymouth, Mich.

Station 50 further includes a torque sensor assembly 55 including a multiple axis load cell 66 mounted upon the end of a linearly translating arm 68 that is coupled to a servo positioning actuator 69. Load cell 66 is preferably a triaxial (three axis) piezoresistive load cell, such as Model #9251A, commercially available from Kistler Instrument Corp. of Amherst, N.Y. Such a load cell 66 nominally measures the force applied against the top plate 66a in three orthogonal directions, providing three force vector components (e.g., i, j, and k). Typically, the resultant torques measured are between 0.3 to 0.4 Nm, while load cell 66 has a sensitivity allowing the measurement of changes of approximately 0.0008 Nm.

A load button 70 having a spherical contact head 72 is mounted to the top plate 66a of load cell 66. Spherical contact head 72 is sized to be readily received within hole 19. Load cell 66 is coupled to a controller 100, which receives the load cell's force vector data to control the relative rotational speeds of spindles 52, 54.

In one non-limiting embodiment, torque sensor assembly 55 includes a second arm configured to translate in the same horizontal plane as arm 68, but orthogonal to the directions of motion of arm 68, illustrated by arrows 73, to place the load button 70 in substantially any position within that horizontal plane.

After the differential gear assembly 10 is assembled as generally shown in FIG. 3, the antifriction bearings 20, 22 are preloaded. The preloading process begins by transferring a pallet 40 supporting a differential assembly 10 to bearing preload station 50. The pallet 40 is positioned adjacent to station 50 with the longitudinal axes of spindles 52, 54 and pinion shaft 16 substantially coaxial. Spindles 52, 54 are lowered until drive head 60 contacts and locates yoke 32 and socket 62 is seated over pinion nut 28. A load arm 76 having a freely rotating center locating device 75 located on the distal end thereof is raised, bringing the center locating device 75 to contact the pinion 24. A load applied by arm 76 toward the spindles 52, 54 causing the spindles 52, 54 to retract, thus lifting the differential assembly 10 off of the pallet 40 to a raised position shown in FIG. 4. In this manner, hole openings 19 are accessible through the bottom end 19a. It should be appreciated that once the differential assembly 10 is lifted, the entire differential assembly 10 is fully supported by the pinion shaft 16 through the pinion bearings 20, 22.

Figure 4:
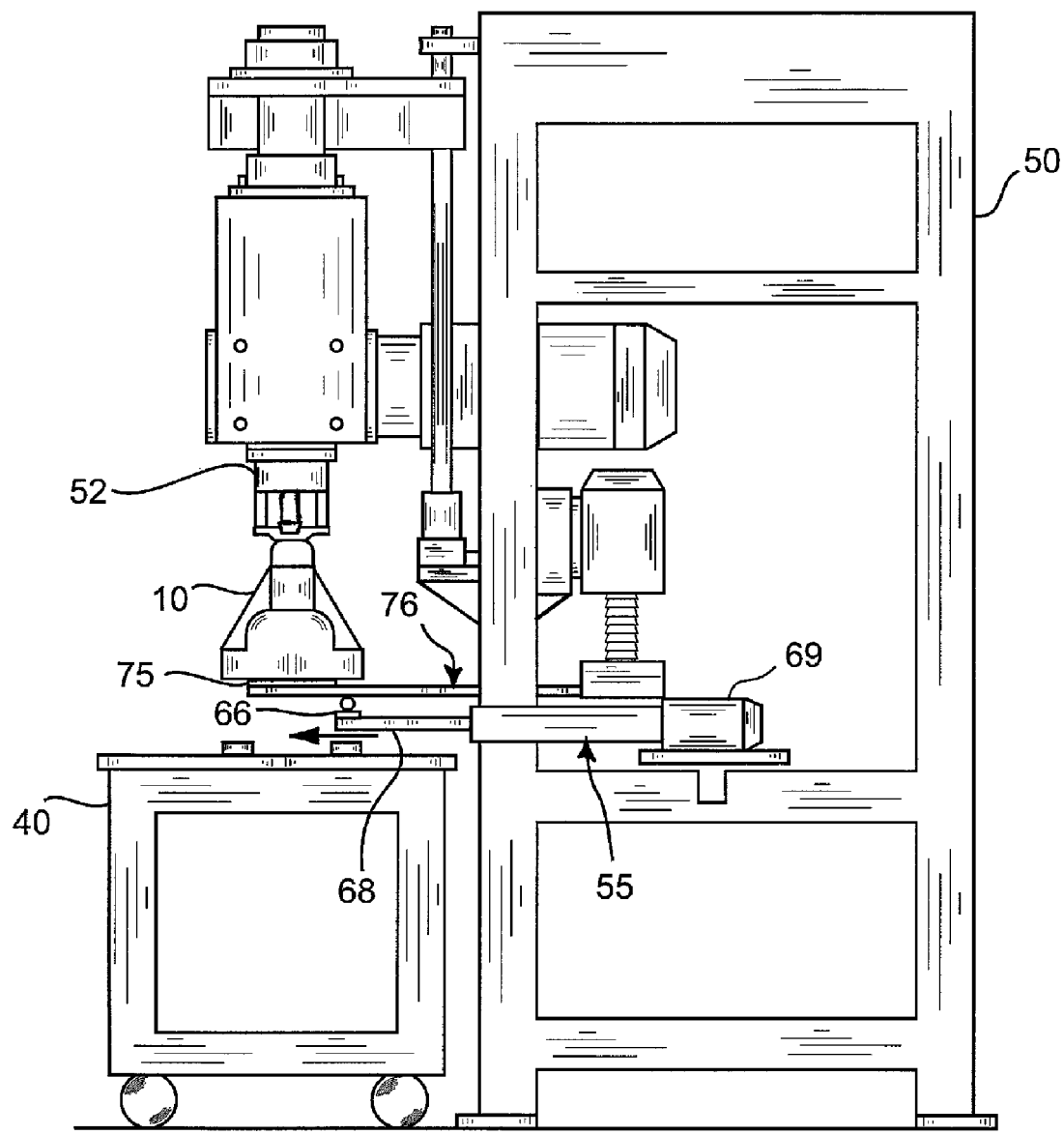
FIG. 4 is a side view of the differential bearing preload station in a raised position with the differential assembly lifted up above an extended sensor arm.

Torque sensor assembly 55 is located upon support base 56 such that arm 68 and load cell 66 can be extended from: 1) a rest position (shown in FIG. 1), which permits a loaded pallet 40 to freely travel along an assembly line to enter and exit station 50; 2) to an active position, shown in FIG. 4, where the arm 68 is extended over pallet 40 and beneath the raised differential assembly 10. Arm 68 is extended out a distance where the spherical contact head 72 is substantially coextensive with the longitudinal axis 74 of one of the carrier housing's cylindrical bolt holes 19.

Figure 2:
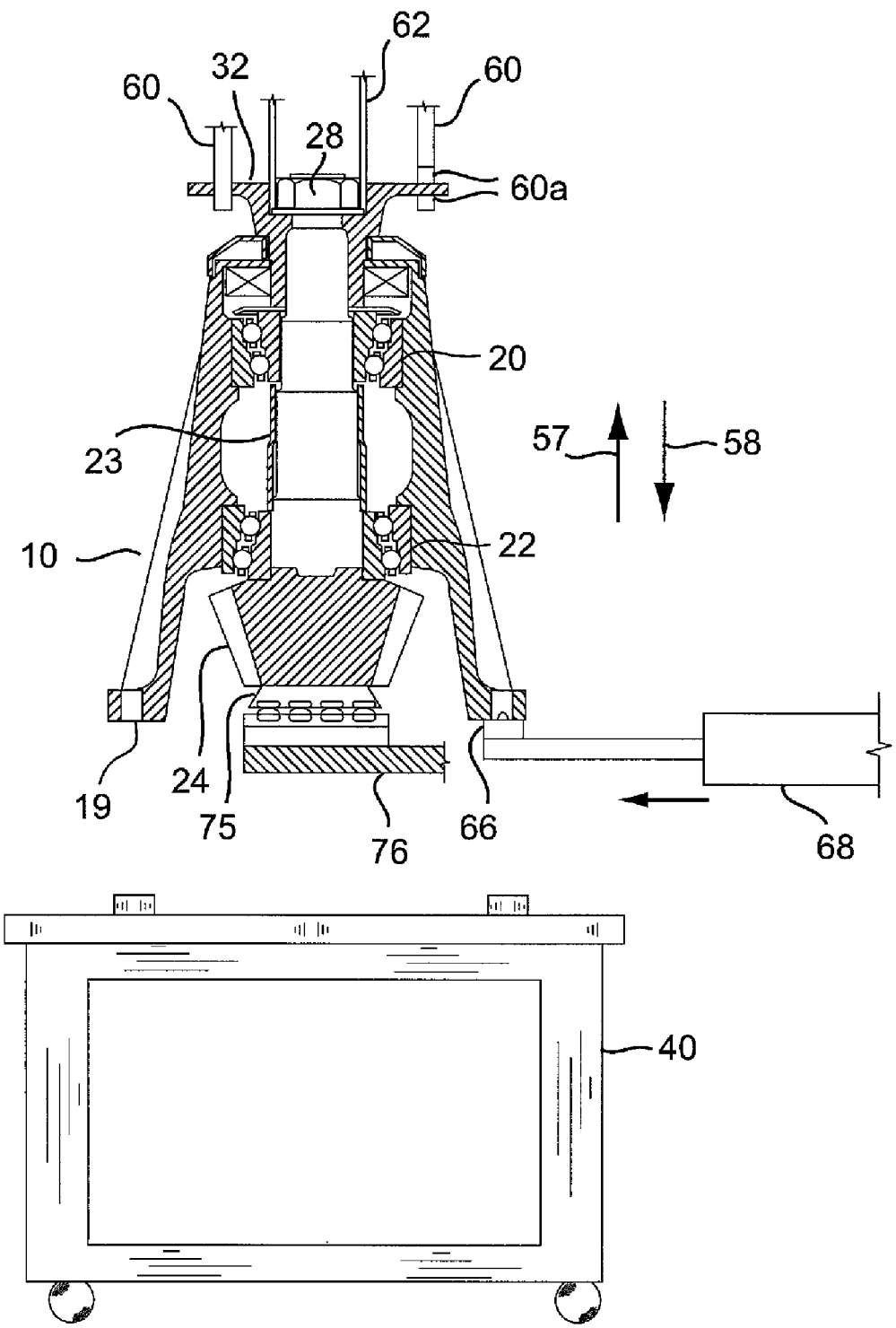
FIG. 2 is a partial side sectional view of a differential assembly loaded within the preload station of FIG. 1 and in a driving or operating position.

Once the load button 70 and bolt hole 19 are aligned, differential assembly 10 is lowered to a driving position, shown in FIGS. 2 and 3. In this driving position, at least a portion of the spherical contact head 72 is positioned within hole 19. To ensure that the load button 70 remains in contact with the carrier housing 12, the assembly 10 is preferably lowered to a point where at least the midpoint of the spherical head 72 (i.e., the diameter of the sphere along a plane) is past the surface of the hole inlet 19a.

After the differential assembly 10 is positioned with the spherical load cell button head 72 inserted within one of the holes 19, the spindles 52, 54 are rotated clockwise together. Initially, the spindles 52, 54 are rotated at the same speed to maintain relative positions of the nut 28 and pinion shaft 16. The rolling resistance within the pinion bearings 20, 22, (due to their supporting the weight of the differential assembly 10) results in the housing 12 to rotate slightly until the cylindrical inner wall 19b of the hole abuts the spherical contact head 72. Once the hole wall 19b abuts contact head 72, the differential housing assembly 10 is restrained from further movement by the torque sensor assembly 55. At this point, load cell 66 will begin receiving the force exerted by the rolling resistance within bearings 20, 22 by the rotating pinion shaft 16. Because the distances between the pinion shaft's rotational axis and the center of gravity of the differential assembly 10 to the spherical contact head 72 are constant and known, the force vector applied against load cell 66 is converted via conventional and well known means (e.g., vector algebraic analysis) to determine the relative forces within the differential assembly bearing set 20, 22.

Based upon the forces measured by load cell 66, controller 100 directs spindle 54 to increase its rotational speed relative to spindle 52, e.g., approximately 3-50 rpms faster than spindle 52. In this manner, the nut 28 is tightened onto the threaded end 26 of the pinion shaft 16 to preload the antifriction bearings 20, 22. This creates a compressive force which initially causes sleeve 23 to collapse in a known and customary manner. Further tightening of nut 28 on threaded end 26 further longitudinally compresses the roller bearings 20, 22 thereby changing the rolling resistance within the bearings 20, 22 until the bearings are preloaded a desired amount.

Once the load cell 66 measures that the desired force is being transmitted through the carrier housing 12 by the antifriction bearings 20, 22, the rotating spindles 52, 54 are stopped, the differential assembly 10 is lifted upward off of the torque sensor's load button 70, the torque sensor arm 68 and load cell 66 are retracted to the rest position and then the differential assembly is lowered down onto the pallet 40 for further assembly.

Importantly, the novel use of a spherical load button 72 and triaxial load cell 66 in concert with the machined, consistently located measuring location of a carrier housing's hole 19, results in the present invention being particularly useful in assembly line operations where various configurations of differential assemblies can pass through a single bearing preload station 50.

Further, the angle of contact between the load button and housing does not matter in the present invention as the triaxial load cell 66 and controller 100 interprets the received force and provides a force vector in the direction of the resultant torque/rolling resistance within the bearing set 20, 22.

From the foregoing description, one skilled in the art will readily recognize that the present invention is directed to a system and method of measuring the preload condition of a differential gear assembly having low rolling resistance angular contact ball bearings. While the present invention has been described with particular reference to various preferred embodiments, one skilled in the art will recognize from the foregoing discussion and accompanying drawing and claims that changes, modifications and variations can be made in the present invention without departing from the spirit and scope thereof.

The invention claimed is:

1. A method of measuring bearing preload in a differential gear assembly's angular contact ball bearing set, the bearing set supporting a pinion shaft within a housing having at least one cylindrical opening formed in an exterior surface of the housing, said method comprising the steps of:
   providing a multi-axis load cell measuring force in three orthogonal directions, the load cell having a spherical load button;
   positioning said spherical load button within one of said cylindrical openings;
   rotating said pinion shaft relative to said housing so that said rotating pinion shaft imparts a torque to said housing through said bearing set, wherein said housing rotates and an inner surface of said cylindrical opening abuts said load button; and
   measuring a force applied by said housing against said load button.

2. A method as defined in claim 1, further comprising the step of supporting said differential gear assembly from said pinion shaft, wherein said housing is fully supported by said bearing set.

3. A method as defined in claim 2, wherein said step of measuring a force further comprises measuring three orthogonal forces applied to said load button by said housing.

4. A method as defined in claim 2, further comprising the step of advancing a nut axially along a threaded portion of said pinion shaft to apply a compressive force upon said bearing set thereby changing the rolling resistance within said bearing set and changing the force applied by said housing against said load button.

5. A method as defined in claim 1, wherein said step of positioning said spherical load button further comprises:

extending said load cell toward said housing wherein said load button is linearly coextensive with a centerline of one of said cylindrical openings; and moving at least one of said load cell and housing relative to each other axially along said centerline such that at least a portion of said load button is disposed within said one of said cylindrical openings.

6. A method as defined in claim 5, wherein said centerline is substantially vertical and said step of moving at least one of said load cell and housing relative to each other further comprises translating said housing vertically downwardly.

7. A method of measuring bearing preload in a differential gear assembly having an input shaft supported by an antifriction bearing set within a differential, said method comprising the steps of:

lifting and supporting said differential gear assembly by said input shaft such that a longitudinal axis of said input shaft is in a known orientation;

positioning a spherical load button within a cylindrical opening in the housing;

rotating said input shaft relative to said housing so that said rotating input shaft imparts a torque to said housing through said bearing set, wherein said housing rotates to abut an inner surface of said cylindrical opening against said load button; and measuring a force applied by said housing against said load button in three orthogonal directions.

8. A method as defined in claim 7, further comprising the step of applying a compressive force to said bearing set axially while said input shaft is rotated.

9. A method as defined in claim 7, further comprising the steps of:

extending said load button toward said housing wherein said load button is coextensive with a centerline of said cylindrical opening; and moving at least one of said load button and housing relative to each other along said centerline such that at least a portion of said load button is disposed within said cylindrical opening.

10. A method as defined in claim 9, wherein said step of measuring a force further comprises: providing a piezoresistive triaxial load cell and mounting said spherical ball upon a force input plate of said load cell.

11. A method as defined in claim 7, wherein said known orientation is vertical.

12. A system for measuring bearing preload in a differential gear assembly's angular contact ball bearing set, the bearing set supporting a pinion shaft within a housing having at least one cylindrical opening formed in an exterior surface of the housing, comprising:

an actuator arm that is movable from a collapsed rest position to an extended position;

a multi-axis load cell mounted upon and end of said actuator arm;

a load button mounted to a force input plate said load cell, said load button being sized to fit within said at least one cylindrical opening; and means for lifting and rotating said differential gear assembly by said pinion shaft;

wherein said load button is coextensive with one of said cylindrical openings when said actuator arm is in said extended position and said load cell measures a resultant force transmitted through said bearing set when said lifting and rotating means rotates said pinion shaft.

13. A system as defined in claim 12, wherein said multi-axis load cell is a triaxial piezoresistive load cell.

14. A system as defined in claim 12, wherein said load button comprises a spherical contact head, wherein said spherical contact head is sized to be received within said at least one cylindrical opening.

15. A system as defined in claim 14, further comprising:

means for tightening a pinion nut along said pinion shaft to compress and preload said bearing set; and a controller which is communicatively coupled to: said load cell, said lifting and driving means, and said pinion nut driving means, wherein said controller stops said pinion nut tightening means when said load cell measures a desired resultant force.

* * * * *